US007664702B2

(12) United States Patent
Jung et al.

(10) Patent No.: US 7,664,702 B2
(45) Date of Patent: Feb. 16, 2010

(54) METHOD OF CONDUCTING AN EMV PAYMENT PROCESS USING IRFM

(75) Inventors: Eun Su Jung, Kyunggi-do (KR); Kwon Je Seong, Kyunggi-do (KR); Jong Sung Park, Seoul (KR); Chang Ho Choi, Kyunggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 727 days.

(21) Appl. No.: 10/250,478

(22) PCT Filed: Oct. 28, 2002

(86) PCT No.: PCT/KR02/02009

§ 371 (c)(1),
(2), (4) Date: Jul. 2, 2004

(87) PCT Pub. No.: WO03/038712

PCT Pub. Date: May 8, 2003

(65) Prior Publication Data

US 2004/0236672 A1    Nov. 25, 2004

(30) Foreign Application Priority Data

Nov. 2, 2001    (KR)    ............... 10-2001-0068082

(51) Int. Cl.
G06Q 20/00    (2006.01)
G06F 21/00    (2006.01)
G06K 5/00     (2006.01)
G06F 7/08     (2006.01)
G06K 7/10     (2006.01)

(52) U.S. Cl. .................. 705/41; 705/39; 705/64; 705/65; 705/67; 705/72; 705/21; 235/380; 235/381; 235/462.46; 235/472.02

(58) Field of Classification Search ............ 705/41, 705/39, 64, 65, 67, 72; 235/380, 381, 462.46, 235/472.02
See application file for complete search history.

(56) References Cited

U.S. PATENT DOCUMENTS 6,175,921 B1 *   1/2001   Rosen ................... 713/173

(Continued)

FOREIGN PATENT DOCUMENTS

KR    2001-22217    3/2001

(Continued)

OTHER PUBLICATIONS

Schneier, Applied Cryptograpy, 1996, John Wiley & Sons, Inc., Second Edition, 52-56, 28-31, vii-xiv.*

(Continued)

Primary Examiner—James P Trammell
Assistant Examiner—Scott S Trotter
(74) Attorney, Agent, or Firm—Lowe Hauptman Ham & Berner, LLP

(57) ABSTRACT

The present invention relates to a method of conducting an EMV (Europay Master Visa) payment process optimally using IrFM (Infrared Financial Messaging) between a mobile terminal and a POS (Point Of Sale) terminal. In the present method, if a buyer is authenticated based on information written in a card chip installed in a mobile terminal, information for transaction approval is transmitted to a POS terminal, and if an approval is responded from the POS terminal, a digital receipt for this transaction is transmitted to the POS terminal. Then, if transaction end is requested from the POS terminal, a connected session is released.

18 Claims, 4 Drawing Sheets

U.S. PATENT DOCUMENTS

| | | | | |
|---|---|---|---|---|
| 6,305,603 | B1 * | 10/2001 | Grunbok et al. | 235/379 |
| 6,587,835 | B1 * | 7/2003 | Treyz et al. | 705/14 |
| 6,808,110 | B1 * | 10/2004 | Von Brockdorff | 235/380 |

FOREIGN PATENT DOCUMENTS

| | | |
|---|---|---|
| WO | WO 99/08238 A1 | 2/1999 |

OTHER PUBLICATIONS

Ian R. Sinclair, Collins Dictionary of Computing, 2000, Collins, ROM & PROM.*

* cited by examiner

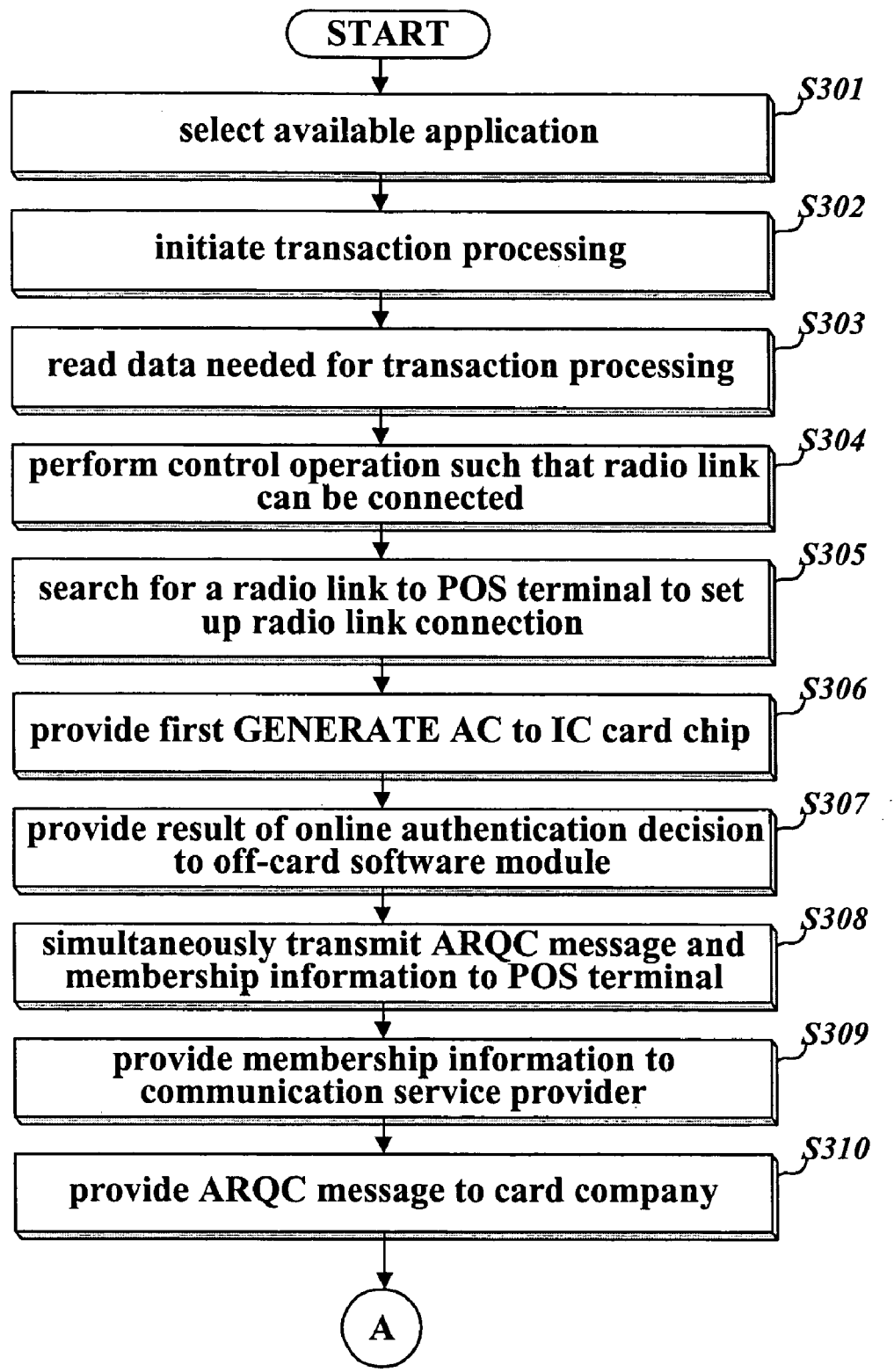

METHOD OF CONDUCTING AN EMV PAYMENT PROCESS USING IRFM

CROSS REFERENCE TO RELATED APPLICATION

This application is a 35 USC § 371 National Phase Entry Application from PCT/KR02/02009, filed Oct. 28, 2002, and designating the U.S.

TECHNICAL FIELD

The present invention relates to a method for performing an EMV (Europay, Master and Visa) payment process, and more particularly to a method for performing an optimum transaction process between a mobile communication terminal and a POS (Point Of Sale) terminal being a payment-processing terminal.

BACKGROUND ART

Conventionally, a basic concept of IrFM (Infrared Financial Messaging) is associated with a profile of a financial transaction based on IrDA (Infrared Data Association) that is near-distance radio connection method. There is proposed a financial payment method in various environments using a PTD (Personal Trusted Device) in relation to the IrFM.

An operation of an IC (Integrated Circuit) card module is always performed through a POS (Point Of Sale) terminal, and because the IC card module is always in a standby state a buyer holding the IC card module commands the IC card module to transmit response data such that the IC card module can give a response to a request from the POS terminal.

That is, where a conventional EMV (Europay, Master and Visa) payment process is performed on the basis of the IrFM, several (e.g., at least 9 or 10) transactions between the POS terminal and the IC card module are conducted through two-way communications.

The case where the transactions between the POS terminal and the IC card module through the two-way communications will be described with reference to a flowchart shown in FIG. 1. Where the IC card module is inserted into the POS terminal, the POS terminal is initialized or reset in response to a reset signal at step S1.

If the POS terminal is reset, applications to be used for the transaction among applications supported by the IC card module and the POS terminal are selected. Then, a list of available applications is created and one application is selected from the list at step S2.

The POS terminal then provides a GET PROCESSING OPTION command, i.e., a command for synchronization, to the IC card module to notify the IC card module that transaction processing has been initiated at step S3. At this time, the IC card module provides, to the POS terminal, an AFL (Application File Locator) in response to the GET PROCESSING OPTION command.

The POS terminal then reads application data needed for the transaction processing from the IC card module. At this time, it is determined whether the data must be authenticated using an SDA (Static Data Authentication) or DDA (Dynamic Data Authentication), at step S4.

At step S5, the POS terminal determines whether an issuer authentication for an online transaction of a considerable amount of money is requested or an authentication for preventing an unlawful use, which can not be detected in an offline transaction, through periodic online transaction is requested.

The SDA is an authentication procedure for unchangeable data in card data associated with the IC card module. The SDA is performed to determine whether data recorded by the issuer has not been changed. After performing the SDA for the IC card module, the DDA is performed to authenticate a signature generated by the IC card module.

In the above-described procedure, where the SDA of the offline transaction data is used, the POS terminal checks processing conditions based on data of the POS terminal and the IC card module, including a condition at a time of comparing application version numbers of the POS terminal and the IC card module, determines whether a country code and an asynchronous transfer mode are available and checks a valid period, etc. at step S6.

At step S7, the POS terminal searches for a password inputted from a PIN (Personal Identification Number) to determine whether or not a user of the IC card module is an authorized.

If the password is valid, the POS terminal provides a GENERATE AC (Application Cryptogram) to the IC card module on the basis of a transaction mechanism determined by the IC card module, thereby completing the authentication procedure at step S8.

In the above-described procedure, where the SDA of the online transaction data is used, the POS terminal requests a card company to perform online processing through a VAN (Value Added Network) according to an ARQC (Authorization Request Cryptogram) such that the online authentication can be performed, at step S9.

A host computer of the card company completes the authentication procedure through three steps of an online request, an online response and an issuer authentication to determine whether the transaction must be allowed or rejected at step S10.

As described above, where an IC card module's payment process is based on the EMV, the transaction is accomplished in a state that the IC card module is in connection with the POS terminal. However, there is a problem in that a probability of a radio link disconnection is high because of the increased number of transaction processes between the IC card module and POS terminal. Similarly, if the transaction processes between the conventional IC card module and the POS terminal were applied to a mobile communication terminal such that the authentication procedure and the transaction can be accomplished through the mobile terminal, the number of transaction processes would also increase. For this reason, a user would be inconvenienced because it takes longer time from a transaction start time to a transaction end time required for completing the transaction between the mobile communication terminal and the POS terminal.

DISCLOSURE OF INVENTION

Therefore, the present invention has been made in view of the above problems, and it is an object of the present invention to provide a method for performing an EMV (Europay, Master and Visa) payment process using IrFM (Infrared Financial Messaging), the method capable of rapidly performing a transaction and an authentication procedure by performing an optimum transaction process between a POS (Point Of Sale) terminal and a mobile communication terminal having an IC (Integrated Circuit) embedded therein.

In accordance with an aspect of the present invention, the above and other objects can be accomplished by the provision of a method for performing an EMV (Europay, Master and Visa) payment process based on IrFM (Infrared Financial Messaging) using a mobile communication terminal having a card chip embedded therein, comprising the steps of: (a) selecting a list of available applications supported by the card chip within the mobile communication terminal and a payment-processing terminal and initiating transaction processing; (b) identifying a password of a user of the mobile communication terminal having the card chip embedded therein according to an authentication procedure in an off-card software module being one of the applications, connecting the mobile communication terminal to a radio link in response to a stroked specific key if the user is authenticated, and receiving a credit information request from the payment-processing terminal through the connected radio link; (c) transmitting an ARQC (Authorization Request Cryptogram) message and membership information to the payment-processing terminal in response to the credit information request; (d) allowing the off-card software module to receive an ARPC (Authorization Response Cryptogram) message as a response to the ARQC message, to request the card chip to authenticate an issuer, and to transmit a digital receipt associated with a transaction to the payment-processing terminal if the issuer is authenticated; and (e) allowing the off-card software module to receive a transaction completion message from the payment-processing terminal and to release an connected session.

The above-characterized present invention may quickly perform a transaction and an authentication procedure, reduce a probability of a radio link disconnection and shorten a time required from a transaction start to a transaction end to complete a transaction between a mobile communication terminal and a POS terminal, by performing fewer, e.g., only two EMV-based transaction processes between the POS terminal and the mobile communication terminal having an IC embedded therein through a radio link connection.

BRIEF DESCRIPTION OF DRAWINGS

FIGS. 3a and 3b are detailed flowcharts illustrating a method for performing the EMV payment process using the IrFM in accordance with the present invention.

MODES FOR CARRYING OUT THE INVENTION

Preferred embodiments of the present invention will be described in detail with reference to the annexed drawings.

Figure 1:
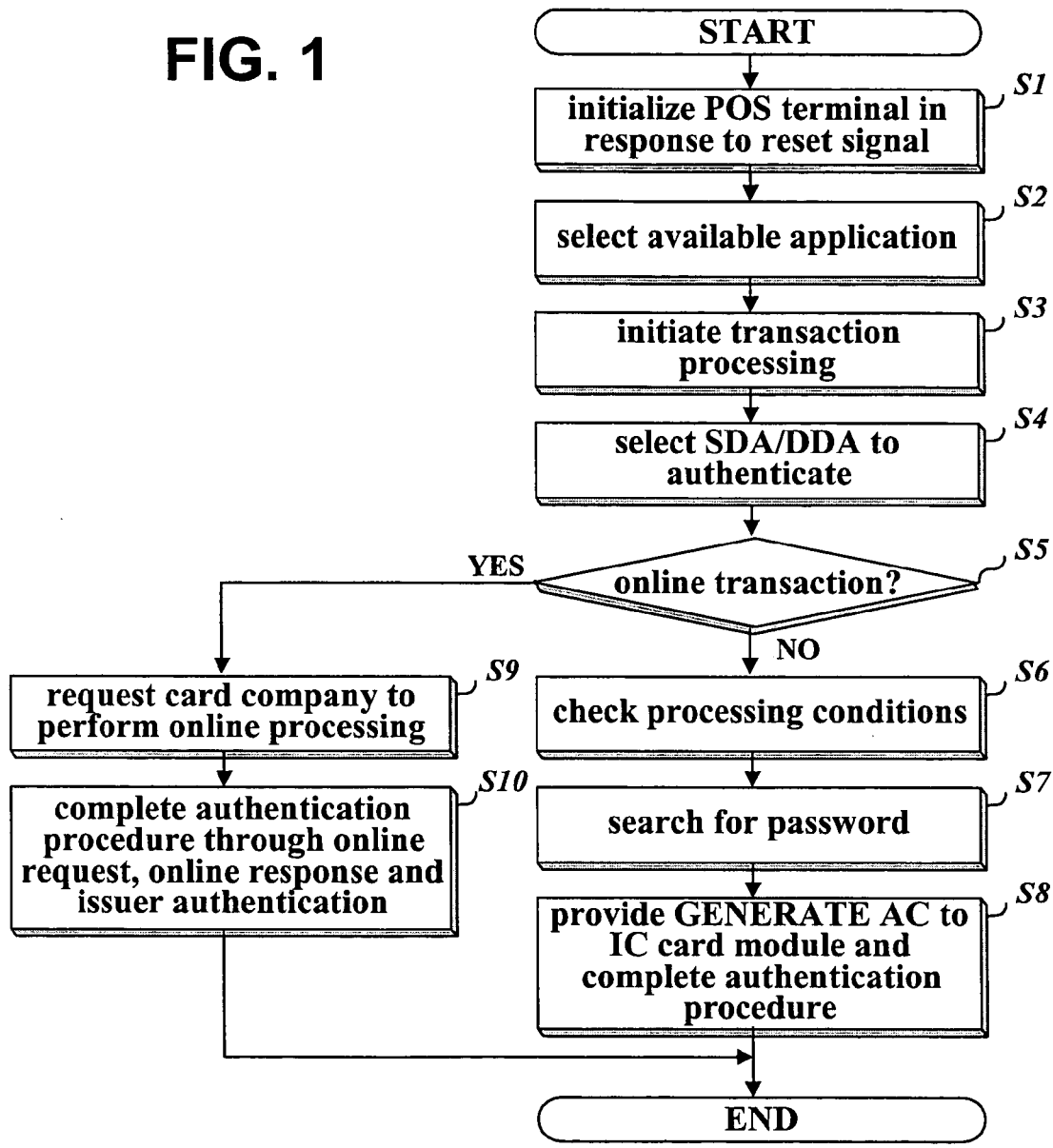
FIG. 1 is a flowchart illustrating a method for performing a conventional EMV (Europay, Master and Visa) payment process.
Figure 2:
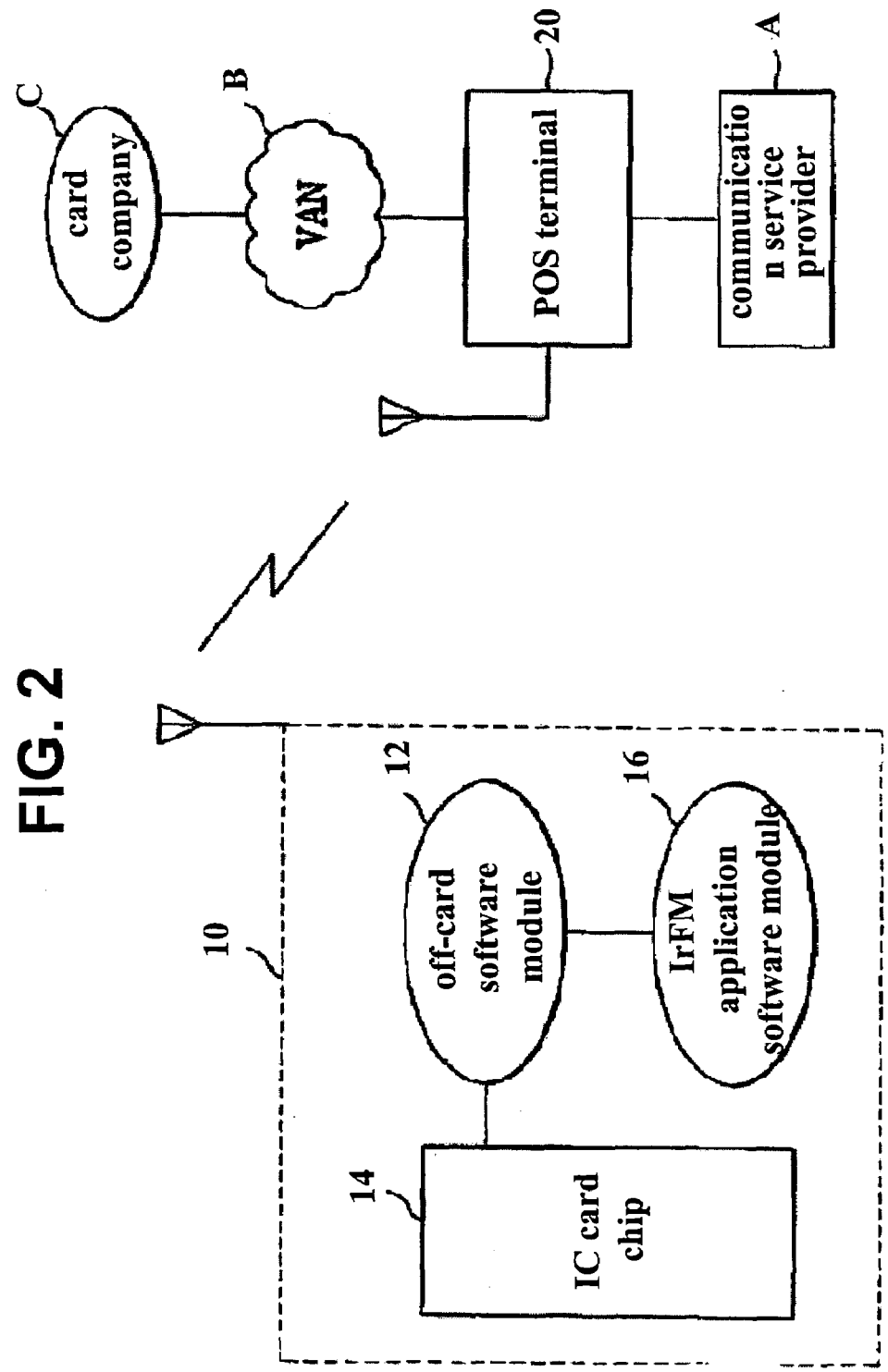
FIG. 2 is a block diagram of a system for performing an EMV payment process using IrFM (Infrared Financial Messaging) in accordance with the present invention.

FIG. 2 is a block diagram illustrating a system for performing an EMV (Europay, Master and Visa) payment process using IrFM (Infrared Financial Messaging) in accordance with the present invention. The system includes a mobile communication terminal 10 and a POS (Point Of Sale) terminal 20.

The mobile communication terminal 10 is a mobile phone used by a general user. The mobile communication terminal 10 has an IC (Integrated Circuit) card chip 14 embedded therein. The mobile communication terminal 10 further includes an off-card software module 12 and an IrFM application software module 16 as software modules.

The off-card software module 12 selects and reads membership information of a user from the IC card chip 14, and stores the read membership information in a memory (not shown) temporarily. The off-card software module 12 selects applications to be used for a transaction among applications supported by the IC card chip 14 and the POS terminal 20, creates a list of available applications, and selects one application from the list.

The off-card software module 12 notifies the IC card chip 14 that a transaction processing is started by sending a GET PROCESSING OPTION command, namely, a command for synchronization.

The off-card software module 12 determines whether a password inputted from a PIN (Personal Identification Number) is valid to know the user of the mobile communication terminal 10 having the IC card chip 14 embedded therein is an authorized card user. If the user of the mobile communication terminal 10 is authorized, the off-card software module 12 receives a specific key to switch an operating mode to an IrFM server mode from the PIN used by the user, and performs a control operation such that a radio link to the POS terminal is searched for and then connected to the IrFM application software module 16.

Where the off-card software module 12 is connected to the radio link, it receives a credit information request from the POS terminal 20. The off-card software module 12 provides a first GENERATE AC (Application Cryptogram) to the IC card chip 14 such that an online/offline authentication can be decided. In the case of the online authentication decision, an ARQC (Authorization Request Cryptogram) message and the membership information stored in the memory are simultaneously transmitted to the POS terminal 20.

After receiving an ARPC (Authorization Response Cryptogram) message as a response to the ARQC message from the POS terminal 20, the off-card software module 12 requests the IC card chip 14 to perform an issuer authentication such to determine whether the ARPC message is a response message having an authorized approval.

After receiving the response message having the authorized approval from the IC card chip 14, the off-card software module 12 provides, to the IC card chip 14, a second GENERATE AC that is a transaction completion message for terminating the transaction with the POS terminal 20. The off-card software module 12 receives a digital receipt generated from the IC card chip 14 at a time of the transaction completion. The off-card software module 12 asks the IC card chip 14 to check whether there exists changed data in relation to card data. If there is no changed data, the off-card software module 12 transmits the digital receipt for accounting to the POS terminal 20.

The IC card chip 14 receives the GET PROCESSING OPTION command for synchronization from the off-card software module 12 and performs a control operation to initiate transaction processing. In response to the GENERATE AC received from the off-card software module 12, the IC card chip 14 provides a signal indicating an online authentication request to the off-card software module 12.

Then, the IC card chip 14 provides the response message having the authorized approval to the off-card software module 12 in response to an issuer authentication request received from the off-card software module 12. Moreover, the IC card chip 14 provides, to the off-card software module 12, the digital receipt generated at the time of the transaction completion in response to the second GENERATE AC.

If the IrFM application software module 16 receives the specific key to switch the operating mode to the IrFM server mode from the PIN used by the user, it searches for a radio link to connect itself to the POS terminal 20. When receiving an IrFM cutoff request message being a transaction completion message from the POS terminal 20, the IrFM application software module 16 cuts off IrFM and then releases all connected sessions.

The POS terminal 20 has at least one embedded IC card slot and has user interfaces such as a keypad of a basic EMV terminal, an alphanumeric LCD (Liquid Crystal Display) unit, a PIN keypad and another display unit separated from the LCD unit. The POS terminal 20 transmits an IrFM connection request message for a radio link connection to the off-card software module 12 embedded in the mobile communication terminal 10. The POS terminal 20 also transmits a credit information request to the off-card software module 12.

Then, the POS terminal 20 receives the ARQC message and membership information from the off-card software module 12, provides the received membership information to a communication service provider 'A', and provides the ARQC message to a card company 'C' through a VAN (Value Added Network) 'B' at the same time.

Then, the POS terminal 20 receives the ARPC message from the card company 'C' and then transmits it to the off-card software module 12. After receiving a digital receipt from the off-card software module 12, the POS terminal 20 provides the digital receipt to a bank server (not shown) and electronically receives a predetermined amount of money from the bank server. Finally, the POS terminal 20 transmits the IrFM cutoff request message to the off-card software module 12 to close all sessions.

Figure 3B:
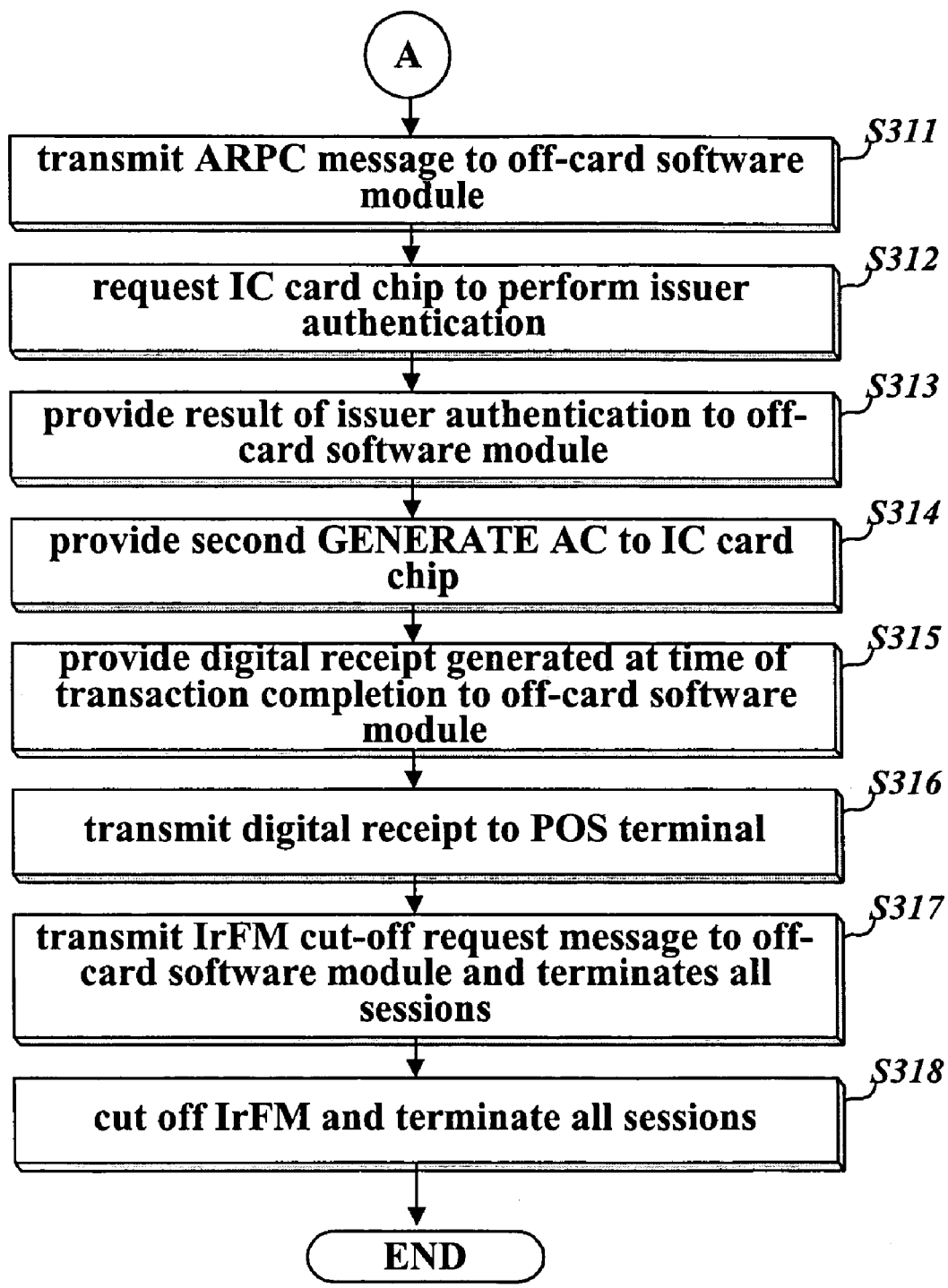

A method for performing an EMV payment process using IrFM in accordance with the present invention will be described in detail with reference to FIGS. 3a and 3b.

First, where the EMV payment process is performed on the basis of the IC card chip 14 using the IrFM between the mobile communication terminal 10 and the POS terminal 20, an online transaction is carried out by two-way communications. In other words, in order to purchase a certain product using the mobile communication terminal 10 as a payment device, a user performs an optimum bi-directional transaction using the mobile communication terminal 10 where the off-card software module 12 and the IrFM application software module 16 are embedded as software modules.

The optimum bi-directional transaction will be described in detail. The off-card software module 12 of the mobile communication terminal 10 selects and reads membership information of the user, who uses the mobile communication terminal 10, from the IC card chip 14 and then stores the read membership information in a memory (not shown) temporarily. Then, applications to be used for the transaction among applications supported by the IC card chip 14 and the POS terminal 20 are selected. Then, a list of the selected applications is created and one application is selected from the list at step 301.

After selecting the application, the off-card software module 12 provides a GET PROCESSING OPTION command for synchronization to the IC card chip 14 to notify the IC card chip 14 that transaction processing has been initiated at step 302.

After the notification, the off-card software module 12 reads data needed for the transaction processing from the IC card chip 14 at step 303.

In online authentication, the off-card software module 12 determines whether the user of the mobile communication terminal 10 with the IC card chip 14 embedded therein is authorized or not. If a password inputted from a PIN is valid, the off-card software module 12 receives a specific key to switch an operating mode to an IrFM server mode from the PIN used by the user, and performs a control operation such that a radio link to the POS terminal 20 is searched for and the IrFM application software module 16 can be connected through the found radio link, at step 304.

Where the specific key to switch the operating mode to the IrFM server mode is received from the PIN used by the user, the IrFM application software module 16 searches for the radio link to connect to the POS terminal 20 in response to an IrFM connection request message for a radio link connection continuously transmitted from the POS terminal 20, at step 305.

After the radio link connection, the off-card software module 12 provides a first GENERATE AC to the IC card chip 14 to determine an online or offline authentication in response to a credit information request received from the POS terminal 20, at step 306.

The IC card chip 14 provides a result of the online authentication decision to the off-card software module 12 in response to the GENERATE AC received from the off-card software module 12, at step 307.

When receiving the result of the online authentication decision from the IC card chip 14, the off-card software module 12 simultaneously transmits an ARQC message and membership information stored in the memory to the POS terminal 20 at step 308.

After receiving the ARQC message and the membership information from the off-card software module 12, the POS terminal 20 provides the membership information to the communication service provider 'A' at step 309 and provides the ARQC message to the card company 'C' through the VAN 'B' at step 310.

Then, the POS terminal 20 receives an ARPC message from the card company 'C' and then transmits the ARPC message to the off-card software module 12 at step 311.

After receiving the ARPC message as a response of the ARQC message from the POS terminal 20, the off-card software module 12 requests the IC card chip 14 to perform an issuer authentication to determine whether the ARPC message is a response message having an authorized approval at step 312.

In response to the issuer authentication request received from the off-card software module 12, the IC card chip 14 provides the response message having an authorized approval to the off-card software module 12 at step 313.

After receiving the response message having an authorized approval from the IC card chip 14, the off-card software module 12 provides, to the IC card chip 14, a second GENERATE AC, which is a transaction completion message, to end a current transaction, at step 314.

In response to the second GENERATE AC received from the off-card software module 12, the IC card chip 14 provides a digital receipt generated at a time of transaction completion to the off-card software module 12 at step 315.

The off-card software module 12 receives the generated digital receipt from the IC card chip 14 and then asks the IC card chip 14 to determine whether any data related to card data is changed or not. If data has been changed, the off-card software module 12 edits the digital receipt as data is changed. Otherwise, the off-card software module 12 transmits the digital receipt to the POS terminal 20 at step 316.

After receiving the digital receipt from the off-card software module 12, the POS terminal 20 provides the digital receipt to a bank sever (not shown) to settle this transaction and then electronically receives an settled amount of money from the bank server. The POS terminal 20 transmits an IrFM cutoff request message to the off-card software module 12 to release all connected sessions, at step 317.

When receiving the IrFM cutoff request message from the POS terminal 20, the off-card software module 12 cuts off the IrFM and then closes its opened sessions at step 318.

Using a mobile communication terminal with an IC card chip embedded therein, a payment process can be performed in a gas station, a vending machine, a tollgate machine and a control device at a parking place, such that the mobile communication terminal for performing an EMV payment process using IrFM can be applicable to various application fields.

Although the present invention has been described in connection with specific preferred embodiments, those skilled in the art will appreciate that various modifications, additions, and substitutions to the specific elements are possible, without departing from the scope and spirit of the present invention as disclosed in the accompanying claims.

The invention claimed is:

1. A method for performing an EMV (Europay, Master and Visa) payment process based on IrFM (Infrared Financial Messaging) using a mobile communication terminal with a card chip embedded therein, said method comprising the steps of:
 (a) executing an application supported by the card chip within the mobile communication terminal and a payment-processing terminal and initiating transaction processing;
 (b) checking a password of a user of the mobile communication terminal according to an authentication procedure in an off-card software module, establishing a direct radio link between the mobile communication terminal and the payment-processing terminal in response to a stroked specific key if the user is authenticated, and receiving a credit information request from the payment-processing terminal through the established direct radio link;
 (c) transmitting (i) membership information and (ii) an ARQC (Authorization Request Cryptogram) message as a single uninterrupted message via the direct radio link to the payment-processing terminal in response to the credit information request;
 (d) allowing the off-card software module to receive an ARPC (Authorization Response Cryptogram) message as a single uninterrupted message from the payment-processing terminal via the direct radio link as a response to the ARQC message, to request the card chip to authenticate an issuer, and to transmit a digital receipt resulted from a transaction to the payment-processing terminal via the direct radio link if the issuer is authenticated; and
 (e) allowing the off-card software module to receive a transaction completion message from the payment-processing terminal via the direct radio and to release a connected session for the transaction.

2. The method set forth in claim 1, wherein the step (a) provides a GET PROCESSING OPTION command for synchronization to the card chip to notify the transaction processing initiation.

3. The method set forth in claim 1, further comprising the step of:
 if the transaction processing has been initiated, allowing the off-card software module included in the mobile communication terminal to read data needed for the transaction processing from the card chip and to receive additional information to authenticate the user.

4. The method set forth in claim 1, wherein, when the specific key is stroked, the step (b) allows an application software module included in the mobile communication terminal to search for a direct radio link to the payment-processing terminal and to connect the mobile communication terminal to the direct radio link in response to a connection request message for a direct radio link connection continuously transmitted from the payment-processing terminal.

5. The method set forth in claim 4, wherein the specific key is provided to switch an operating mode to an IrFM server mode and is provided from a PIN (Personal Identification Number).

6. The method set forth in claim 1, further comprising the steps of:
 if an approval request is received from the payment-processing terminal, allowing the off-card software module to provide a first GENERATE AC (Application Cryptogram) to the card chip to decide an online or offline authentication; and
 allowing the card chip to provide a result of the online authentication decision to the off-card software module in response to the first GENERATE AC.

7. The method set forth in claim 1, wherein the membership information is selected and read from the card chip and then stored in a memory.

8. The method set forth in claim 1, further comprising the steps of:
 if the ARQC message and membership information are transmitted to the payment-processing terminal, allowing the payment-processing terminal to provide the membership information to a communication service provider and to provide the ARQC message to a card company; and
 allowing the payment-processing terminal to receive the ARPC message from the card company and to transmit the ARPC message to the off-card software module included in the mobile communication terminal.

9. The method set forth in claim 1, wherein the issuer authentication is carried out through a checking process on whether the ARPC message received from the payment-processing terminal is a response message having an authorized approval.

10. The method set forth in claim 1, further comprising the steps of:
 if the ARPC message is authorized, providing a second GENERATE AC to the card chip to terminate the transaction with the payment-processing terminal;
 allowing the card chip to provide, to the off-card software module, the digital receipt as a response to the second GENERATE AC;
 allowing the off card software module to receive the digital receipt and to ask the card chip about whether data related to card data has been changed or not; and
 editing, if any changed data exists, the digital receipt based on the changed data.

11. The method as set forth in claim 1, wherein the payment-processing terminal, if the digital receipt is received from the off-card software module, provides the digital receipt to a bank server, electronically receives a settled amount of money from the bank server, transmits the transaction completion message to the off-card software module, and releases the connected session.

12. The method as set forth in claim 1, wherein the membership information and the ARQC message are transmitted simultaneously by the mobile communication terminal via the direct radio link to the payment-processing terminal.

13. The method as set forth in claim 1, further comprising providing the mobile communication terminal with the off-card software module that resides outside the card chip.

14. The method as set forth in claim 1, wherein said transaction is performed with only two EMV-based transaction processes between the payment-processing terminal and the mobile communication terminal.

15. A method of performing an EMV (Europay, Master and Visa) payment process based on IrFM (Infrared Financial Messaging) using a mobile communication terminal that comprises (i) a card chip embedded therein and (ii) an off-card software module that resides outside the card chip, said method comprising:

determining, according to an authentication procedure in the off-card software module, whether a user of the mobile communication terminal is authorized;

establishing a direct radio link between the mobile communication terminal and the payment-processing terminal if the user is authorized;

receiving, by the mobile communication terminal, a credit information request from the payment-processing terminal through the established direct radio link;

transmitting, by the mobile communication terminal, (a) membership information of the user and (b) an ARQC (Authorization Request Cryptogram) message as a single uninterrupted message via the direct radio link to the payment-processing terminal in response to the credit information request;

providing, by the payment-processing terminal, the ARQC message received from the mobile communication terminal to a card company;

forwarding as a single uninterrupted message, by the payment-processing terminal, an ARPC (Authorization Response Cryptogram) message received from the card company as a response to the ARQC message to the mobile communication terminal via the direct radio link;

performing, by the card chip, an issuer authentication to determine whether the ARPC message is authorized;

generating, by the mobile communication terminal, a digital receipt resulted from a transaction and sending the digital receipt to the payment-processing terminal via the direct radio link if the ARPC message is authorized; and allowing the off-card software module to receive a transaction completion message from the payment-processing terminal via the direct radio and to release a connected session for the transaction.

16. The method as set forth in claim 15, wherein the membership information and the ARQC message are transmitted simultaneously by the mobile communication terminal via the direct radio link to the payment-processing terminal.

17. The method set forth in claim 15, wherein said generating comprises the following steps which are performed internally of the mobile communication terminal:

providing, by the off card software module, a GENERATE AC (Application Cryptogram) to the card chip to terminate the transaction with the payment-processing terminal;

providing, by the card chip, the digital receipt to the off-card software module as a response to the GENERATE AC;

checking, by the off-card software module, with the card chip whether any data related to card data has been changed or not; and if any changed data exists, editing, by the off-card software module, the digital receipt based on the changed data and sending the edited digital receipt to the payment-processing terminal.

18. The method as set forth in claim 15, wherein the payment-processing terminal, in response to the digital receipt received from the mobile communication terminal and between said generating and said allowing, provides the digital receipt to a bank server, electronically receives a settled amount of money from the bank server, transmits the transaction completion message to the off-card software module, and releases the connected session.

* * * * *